United States Patent [19]

Sejnoha

[11] Patent Number: 5,337,394
[45] Date of Patent: Aug. 9, 1994

[54] SPEECH RECOGNIZER

[75] Inventor: Vladimir Sejnoha, Cambridge, Mass.

[73] Assignee: Kurzweil Applied Intelligence, Inc., Waltham, Mass.

[21] Appl. No.: 895,618

[22] Filed: Jun. 9, 1992

[51] Int. Cl.[5] ............................................. G10L 7/08
[52] U.S. Cl. ...................................... 395/2.5; 381/41
[58] Field of Search ..................... 381/41, 43; 395/2.5

[56] References Cited

U.S. PATENT DOCUMENTS

| | | | |
|---|---|---|---|
| 4,488,243 | 12/1984 | Brown et al. | 395/2.5 |
| 4,741,036 | 4/1988 | Bahl et al. | 381/43 |
| 4,918,733 | 4/1990 | Daugherty | 395/2.5 |
| 4,933,973 | 6/1990 | Porter | 381/43 |
| 5,003,601 | 3/1991 | Watari et al. | 395/2.64 |
| 5,010,574 | 4/1991 | Wang | 395/2.31 |
| 5,031,217 | 7/1991 | Nishimura | 381/43 |
| 5,073,939 | 12/1991 | Vensko et al. | 395/2.5 |
| 5,220,609 | 6/1993 | Watanabe et al. | 381/43 |

*Primary Examiner*—Allen R. MacDonald
*Assistant Examiner*—Richard J. Kim
*Attorney, Agent, or Firm*—Henry D. Pahl, Jr.

[57] ABSTRACT

In the speech recognizer disclosed herein, alignment of an unknown speech sediment, represented by a finely gradiated sequence of frames, with a model sediment represented by a sequence of states is performed by first preparing respective coarse sequences representing the unknown and model segments thereby to define a coarse matrix representing possible alignments. The fine sequences correspondingly define a fine matrix. A best alignment of the coarse sequences is determined thereby to define a coarse path through the coarse matrix. The coarse path is overlaid on the fine matrix and a corridor is defined which includes fine matrix locations which lie within a preselected metric of the coarse path. Only transitions within the corridor are calculated in determining the fine alignment of the unknown speech segment with the model segment, thereby significantly reducing the number of computations required.

10 Claims, 7 Drawing Sheets

SPEECH RECOGNIZER

BACKGROUND OF THE INVENTION

The present invention relates to speech recognition and more particularly to an improved method of aligning an unknown speech segment with a reference or model speech segment.

As is understood by those skilled in the speech recognition art, differences in manner and speed of speaking, not only from one speaker to another but also from different instances of speech by the same speaker, require that some procedure be utilized for aligning an unknown speech segment with each of the vocabulary models with which it is to be compared before determining a score or measure representing the likelihood of match between the unknown and each model. These procedures are sometimes referred to as time warping. One common method of performing this alignment or matching is so-called Viterbi decoding.

Typically, the unknown speech segment is represented by a segment of multi-dimensional frames and each of the vocabulary model segments is represented by a sequence of states which may themselves be frames or probability distributions of frames. The frames may, for example, comprise essentially instantaneous spectra of the speech sound but it should be understood that other characteristics, such as LPC coefficients, might also be used. In order to obtain a meaningful match calculation, the sequences of frames and states must be relatively finely gradated. For example, a single vocabulary word or model may be represented by a sequence comprising in the order of 50 states. The number of states will of course vary from word to word. The unknown speech sequences will also typically comprise a similar quantity.

A comparison between an unknown speech segment and a model segment can thus be thought of as a matrix, and the alignment process can be considered as determining a best path through the matrix, i.e. a path which results in the best possible score for the matching of the unknown with that particular model. A path is essentially a sequence of frame/state pairs which satisfies certain constraints: successive frame/state pairs are within a necessary grid distance of each other so that there is continuity along the path; time must not be reversed, i.e. the path cannot go back on itself; and all of the input and all of the model should be accounted for, i.e. the search is typically to determine a best path from the origin to the diagonally opposite corner of the matrix.

To rigorously determine a best path through the matrix, it is essentially necessary to calculate the cost of each possible transition from one matrix location to its neighbors and to then calculate the cumulative costs of various paths through the matrix. In actual practice, the computational cost of exhaustive or rigorous determination of a best path can be practically prohibitive and, accordingly, various schemes have been proposed for limiting the search space. It has, for example, been proposed to limit the search area to a corridor which is of fixed width from a simple diagonal from the origin to the far corner. Other predetermined corridor shapes have also been proposed. With each of these schemes, however, there is substantial risk that, if the corridor is made narrow enough to appreciably reduce the level of computation required, the accuracy of the resultant score may be impacted, since there is an appreciable likelihood that the best path will lie outside the corridor. In other words, speed is considerably improved by the use of a narrow corridor but likelihood of error is also substantially increased. Conversely, if a very broad corridor is implemented, the decrease in computation required may mot be appreciable.

Beside limitation of search space, other search techniques have been developed in attempts to reduce the computation required. Among these are the so-called "beam search". In this technique, at each input frame position in the grid, all the scores of the paths from the grid origin (typically the bottom left corner) are compared. Those whose scores are worse than the best score by some threshold are eliminated and not pursued further. This is a 'local' decision in that it is based only on the patterns between this point and the origin. It is entirely possible that a path which seems poor may become the overall winner once all the data is accounted for. Path deletions based on local criteria are thus dangerous and the computational saving may come at the cost of lower accuracy.

Other schemes, such as the 'best-first' (also known as the stack or A*) algorithm, always first pursue the most promising path, frequently reevaluating which is the best path. The hope is that the correct path will be extended all the way across the grid before too much work is expended on the less successful paths. Like the beam-search, the best-first algorithm can suffer from the limitations of decisions which are only locally optimal. To overcome this drawback, these techniques have been enhanced by computing an estimate of the score of completing partial paths to the end. In order to reduce computation, these estimates must be inexpensive compared to the cost of computing the actual path score. The considerable overhead required to maintain complex structures, continually compare paths and make complex decisions based on these comparisons make such search techniques undesirable for the task of limiting the computational cost of aligning an input pattern with a reference model.

Among the several objects of the present invention may be noted the provision of an improved speech recognizer; the provision of such a speech recognizer which utilizes a novel method of deter-mining alignment of an unknown speech segment with a model segment; the provision of such a recognizer which requires less computational effort to achieve a very good alignment; the provision of such a speech recognizer which involves very little risk of excluding a good or best alignment of an unknown speech segment with a model; the provision of such a speech recognizer which is highly reliable and which is of relatively simple and inexpensive implementation. Other objects and features will be in part apparent and in part pointed out hereinafter.

SUMMARY OF THE PRESENT INVENTION

In accordance with one aspect, the method of the present invention utilizes a corridor approach to limit calculation but the corridor is not predetermined in shape or even necessarily symmetrical. Rather, the corridor is defined by an initial coarse alignment calculation.

The speech recognizer of the present invention operates to match an unknown speech segment represented by a finely gradated sequence of frames with model segments represented by fine sequences of states. The recognizer determines an alignment of the unknown with a model segment by first preparing respective coarse sequences representing the unknown and the model, thereby defining a coarse matrix representing possible alignments. A best alignment through the coarse sequences is determined, e.g. by Viterbi decoding, thereby to determine a coarse path through the coarse matrix. The coarse path is overlaid on the fine matrix and a determination is made as to which fine matrix locations lie within a preselected metric of the coarse path, thereby defining a corridor of possible paths through the fine matrix. Calculating only transitions within the corridor, a fine alignment of the unknown segment with the model segment is determined, e.g. again by Viterbi decoding. While the method of the invention requires two steps of path determination, the total number of calculations can be markedly reduced without excluding likely search paths since the corridor can be relatively narrow as compared with a predetermined corridor shape.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
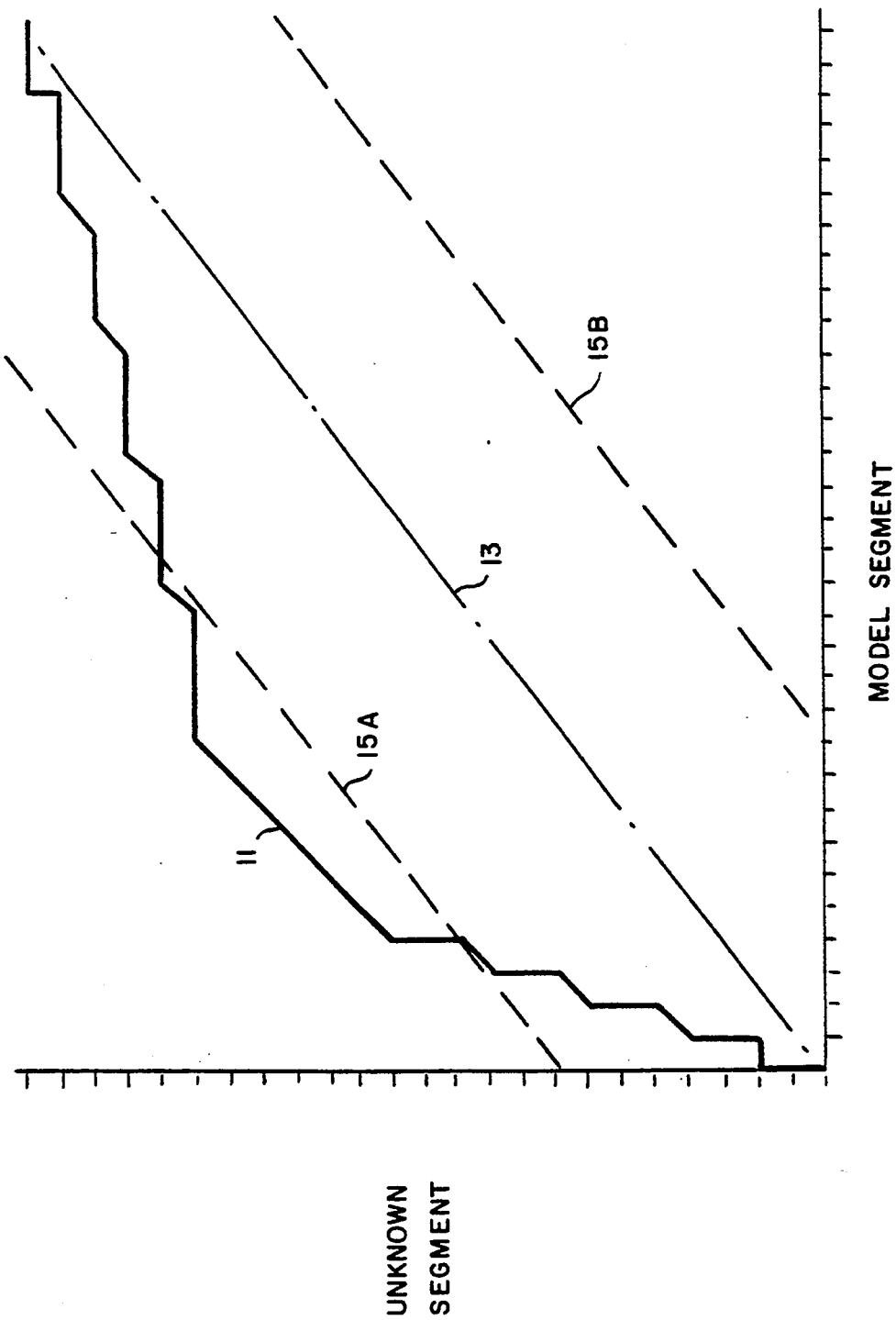
FIG. 1 is a diagram illustrating a fine matrix of frames representing an unknown speech segment and a reference or model segment and showing a path defining a best alignment of the two patterns.

Referring now to FIG. 1, the matrix illustrated there is simplified or abbreviated for the purpose of illustration and represents an unknown speech segment of twenty four frames being compared with a reference or model segment of thirty two states. As indicated previously, it is desirable in computing the likelihood of match between the unknown segment and the model segment that a best temporal alignment of the unknown with the model be achieved in conjunction with the similarity measurements. Transitions from one matrix intersection to the next can only be made upwards; to the right; or diagonally, as illustrated. In the Viterbi decoding employed in the particular embodiment illustrated, each intersection can only be approached from its immediate neighbor to the left; from directly below; or from the 45 degree diagonal. This is required essentially since the alignment process cannot move backward in time. While Viterbi decoding is assumed, it should be understood that other alignment strategies are known and could be employed in the present invention.

The path represented by reference character 11 illustrates an entirely possible best alignment between an unknown speech segment and a model speech segment. As may be seen, this alignment path departs significantly from a straight line from the origin to the far corner, this latter line being indicated by reference character 13.

As indicated previously, to absolutely and rigorously search for the best possible alignment path, it would be necessary to calculate values for each possible transition in the matrix and to determine the best path from combinations of these values. Viterbi decoding substantially reduces the number of calculations without significantly impacting the likelihood of finding the best path but is still computationally intensive if rigorously approached.

As indicated earlier, one approach towards limiting the search space is to provide a predetermined corridor and to only calculate transition values which lie within that corridor. In FIG. 1, a corridor which extends eight increments above and eight increments below the straight line diagonal is marked by boundaries designated by reference characters 15A and 15B. Although this corridor envelopes a substantial part of the search space, it does not fully encompass the hypothesized best path 11 and thus a likelihood of match calculated using only values within the corridor will not accurately represent the best match between the unknown segment and the model.

In accordance with one aspect of the invention, a corridor is employed for the limitation of computation but the corridor is not predetermined or preselected in relation to the straight line path between the origin and far corner of the matrix.

Figure 2:
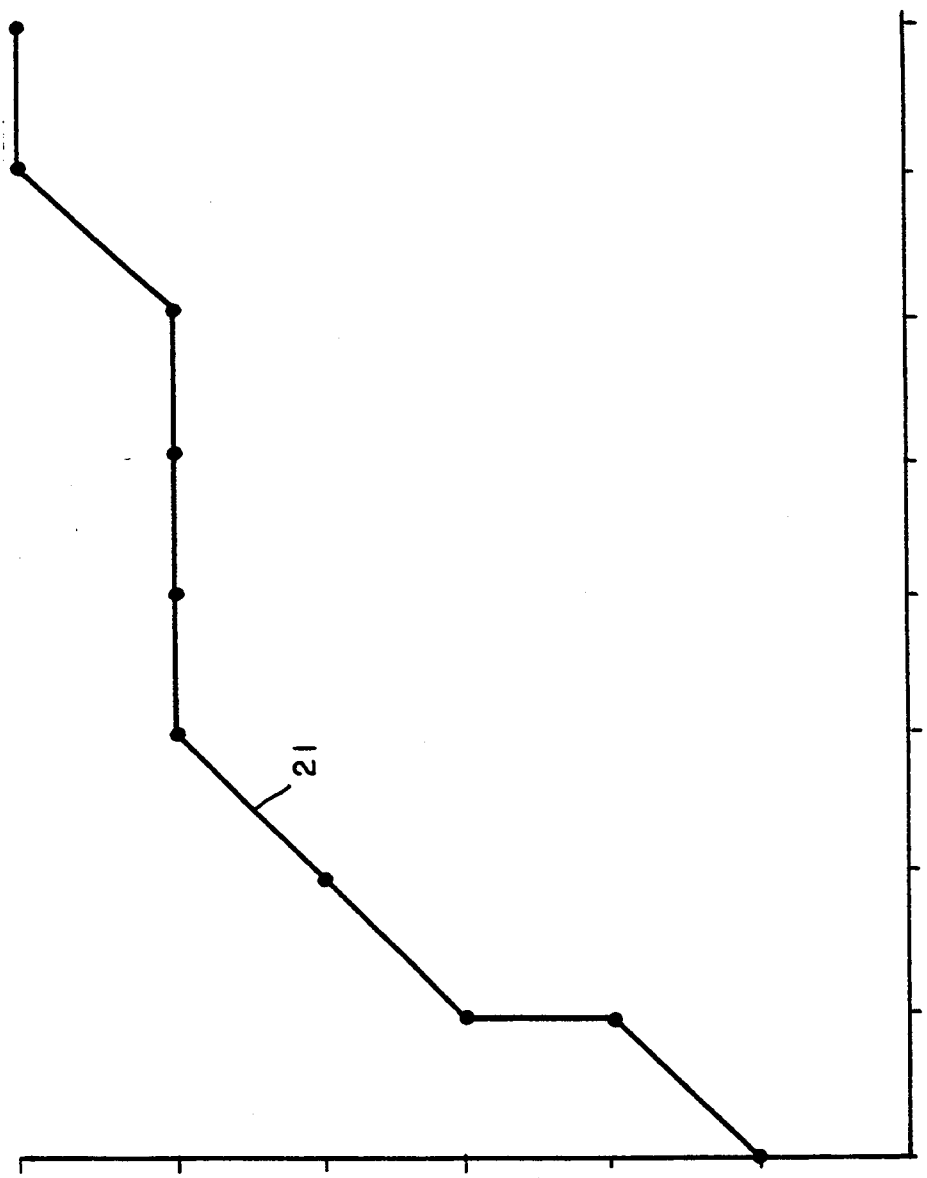
FIG. 2 is a diagram illustrating a coarse matrix obtained by subsampling the sequences defining the fine matrix of FIG. 1 and showing a decoded path through the coarse matrix.

Prior to doing the detailed or finely gradated calculations which are appropriate for determining the final likelihood of match score, an alignment path is calculated using only coarse sequences to represent both the unknown and the model speech segments. In the simplified embodiment illustrated, the coarse sequences are obtained by merely selecting every fourth frame or state from the fine sequences. A coarse matrix defined by the coarse sequence is illustrated in FIG. 2. As is understood, a more representative frame or state may be determined by combining characteristics of the group of frames being spanned. Applying Viterbi decoding to the coarse sequences generates a coarse path through the corresponding coarse matrix, this path being represented by reference character 21 in FIG. 2.

Figure 3:
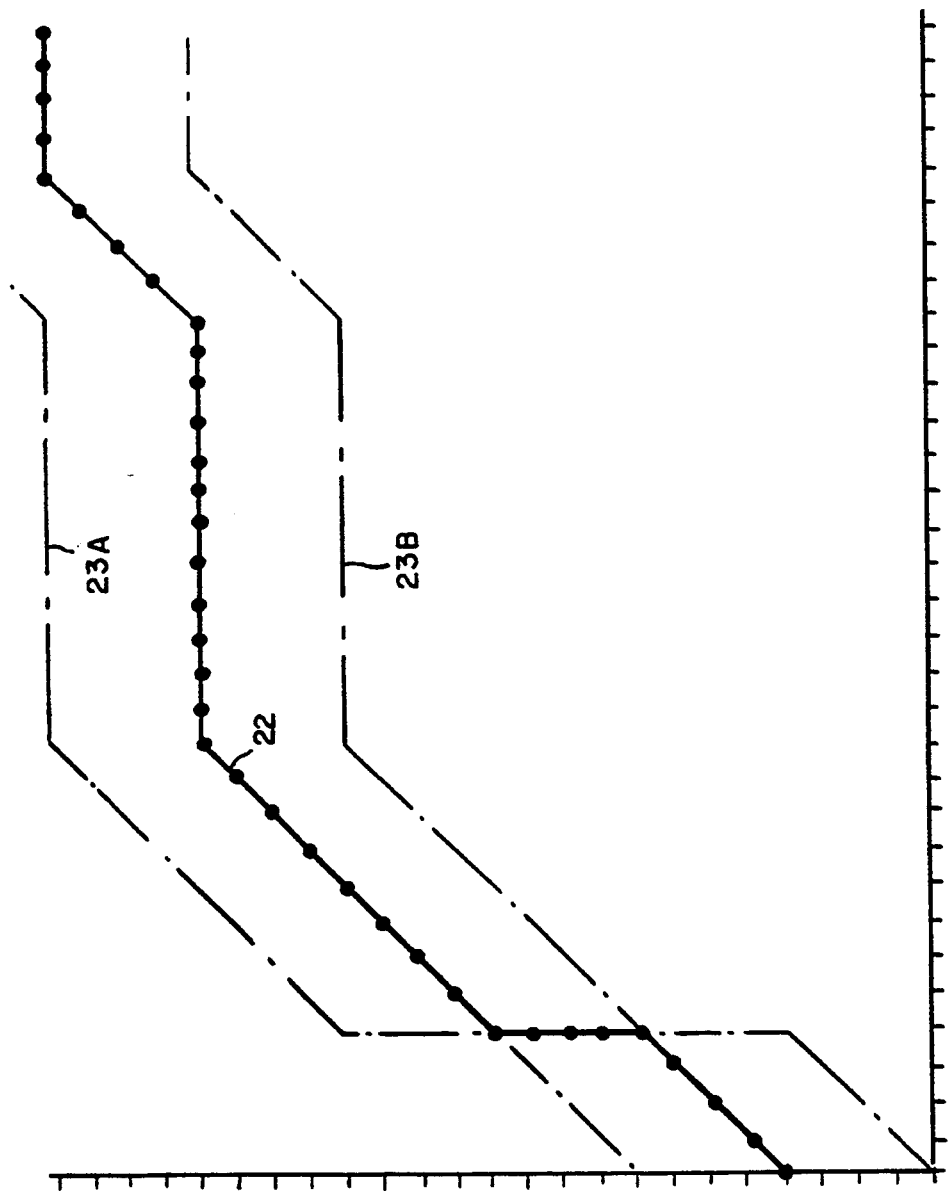
FIG. 3 is a diagram illustrating a fine matrix similar to that of FIG. 1 with the decoded path of FIG. 2 superimposed thereupon together with a corridor defined by that path.
Figure 4:
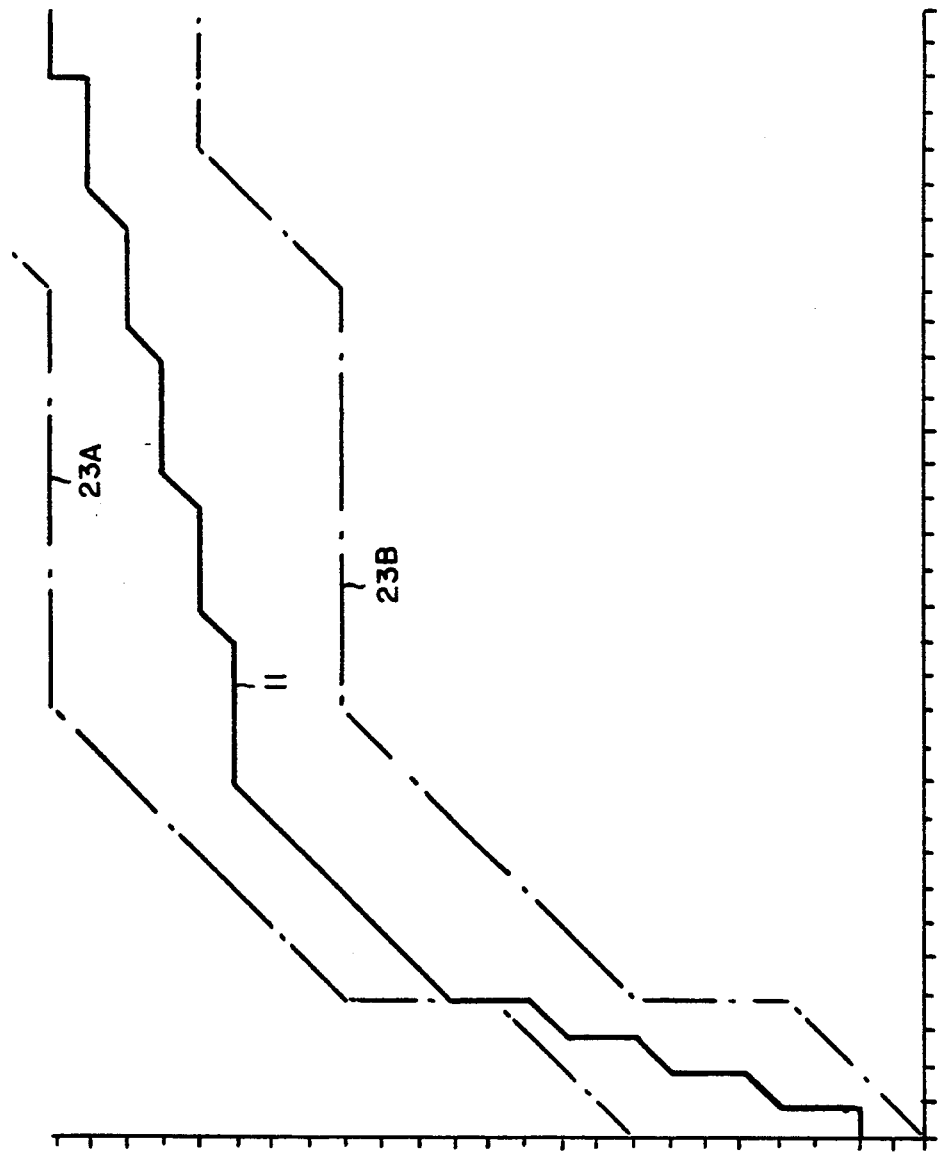
FIG. 4 is a fine matrix diagram showing the corridor of FIG. 3 together with the path of FIG. 1.

The coarse path decoded through the coarse matrix is then superimposed on the fine matrix interpolating between the points defining the coarse path thereby to define a base path 22 as illustrated in FIG. 3. A corridor is then defined which includes all matrix intersections which are within a predetermined metric or measure of the coarse or base path. As will be understood, this metric is not the same as the distance or likelihood measurements which are calculated in determining matching between unknown and model. In FIG. 3, the corridor is delineated by the lines designated by reference characters 23A and 23B which are merely determined as being plus and minus four increments or frames vertically from the coarse or base path 22. FIG. 4 shows the corridor boundaries 23A and 23B and also the best path 13 from FIG. 1 and it can be seen that this path lies entirely within the corridor defined by lines 23A and 23B.

As indicated previously, the corridor of FIG. 3 was obtained by merely going above and below the coarse path by four frames. However, greater clearance and latitude in encompassing the best path can be obtained if both horizontal and vertical distance is considered in measuring the distance from the coarse path to the corridor boundary.

As the best path 13 lies within the corridor defined by lines 23A and 23B, it will be understood that a likelihood of match score calculated using only values for transitions within the corridor will be highly accurate in reflecting the likelihood of match between the unknown speech segment and the model speech segment. Further, although the accuracy of match measurement will be better than that which would be obtained using the predetermined corridor of FIG. 1, the number of computations necessary during the Viterbi decoding of the fine matrix is significantly reduced since the area of the corridor of FIG. 3 is substantially less, i.e. about half, of the area of the corridor of FIG. 1. While the total number of calculations is increased by those necessary to perform the decoding of the coarse matrix, this is a relatively small cost since the number of matrix points is reduced by a factor of sixteen.

Figure 5:
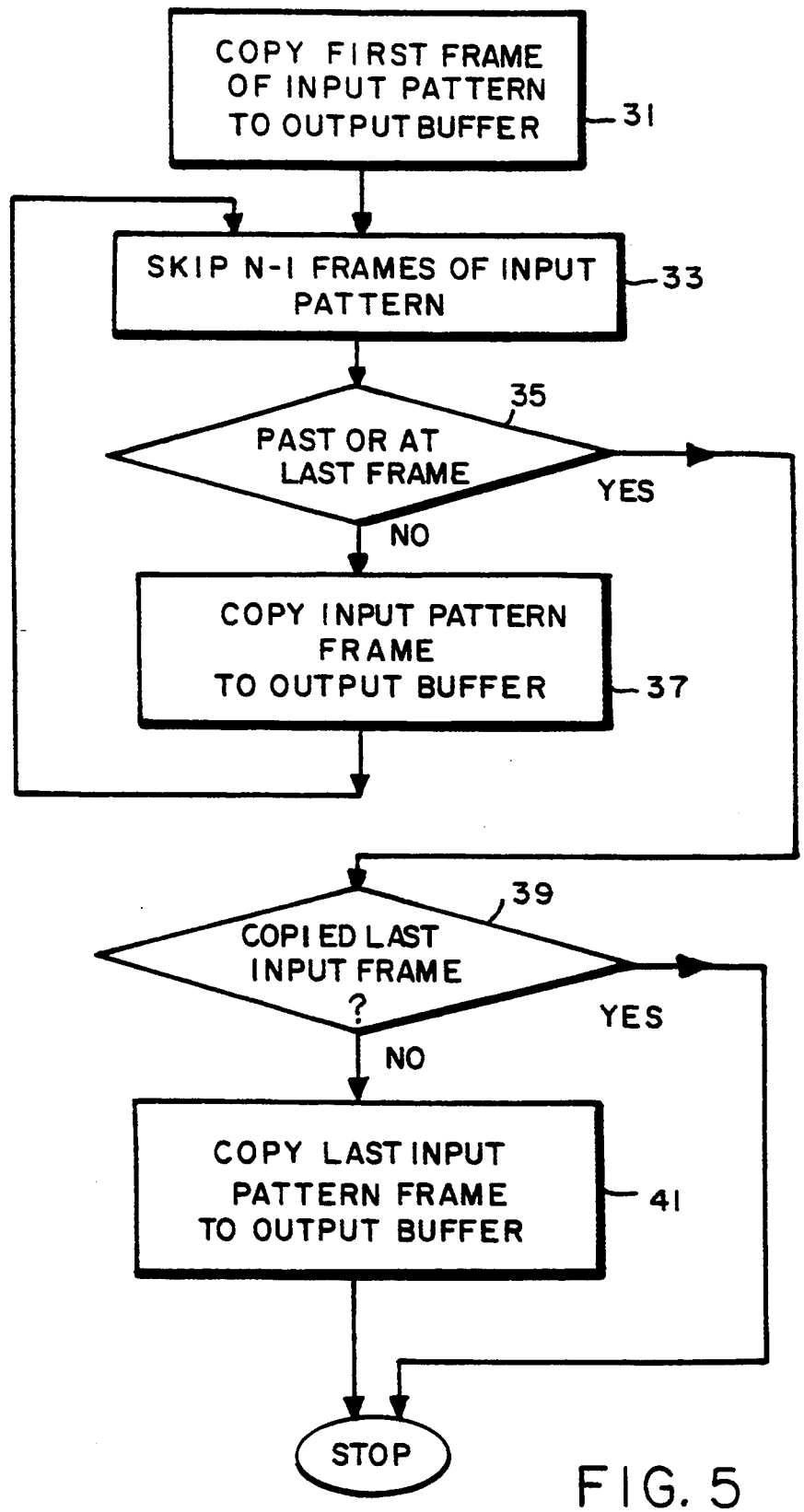
FIG. 5 is a flowchart illustrating a subsampling procedure.

As indicated previously, the coarse matrix of FIG. 2 was generated simply by taking every fourth frame or state to provide a simplified embodiment for clarity of explanation. A practical procedure for selecting frames in an arbitrary spacing and including the first and last frame is illustrated in the flowchart of FIG. 5. As indicated at block 31, the first frame of the input pattern is copied to an output buffer and then N-1 frames of the input pattern are skipped as indicated at block 33, the value N being the scale ratio between the fine and coarse matrices. If the last frame has not been reached or passed, the selected input pattern of the frame is copied to the output buffer, as indicated at block 37, and the skipping procedure is repeated. When the last frame is reached or passed, it is copied to the output buffer as indicated at block 41.

Figure 6A:
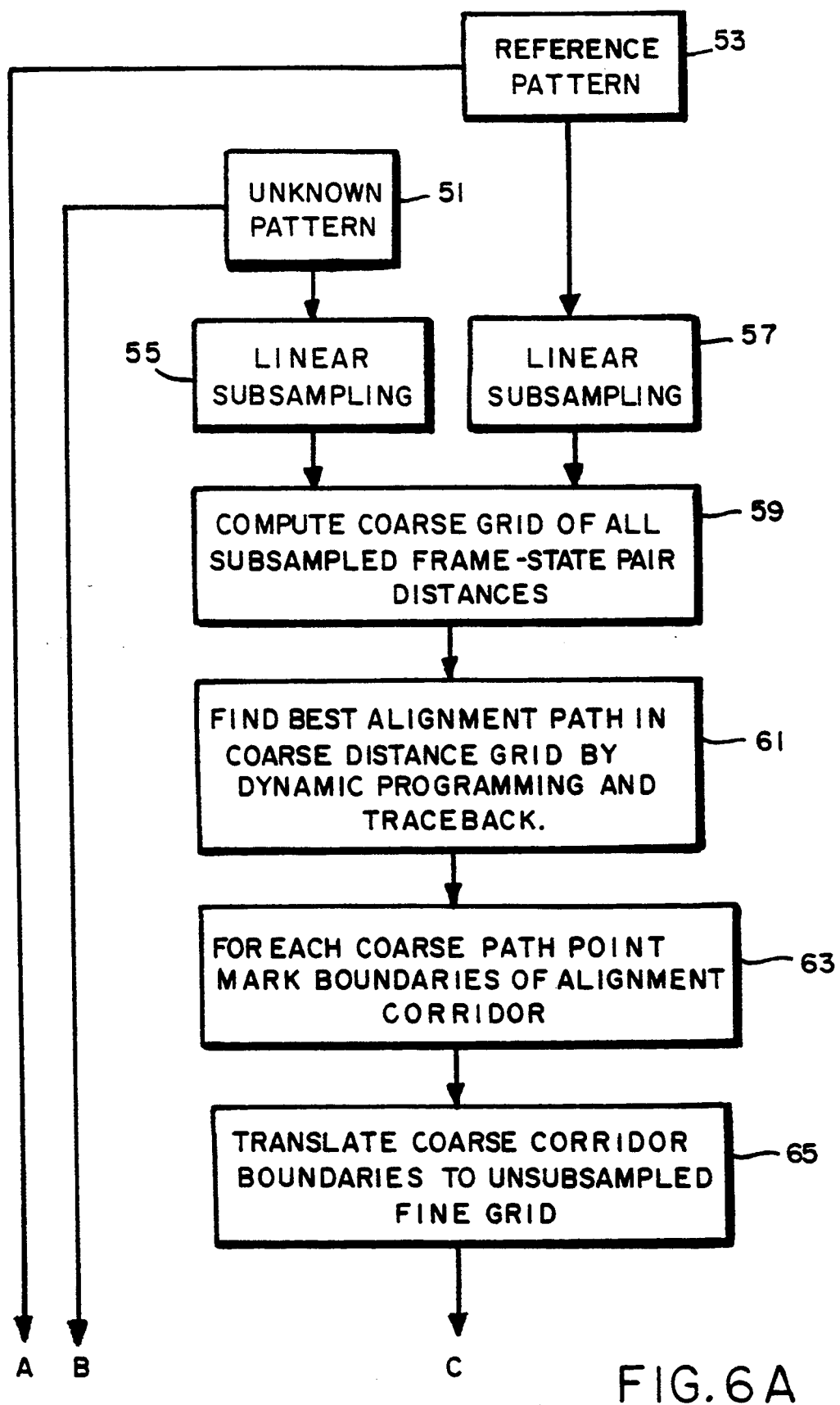
FIGS. 6A and 6B are a flowchart illustrating a procedure for defining a corridor through an alignment matrix.
Figure 6B:
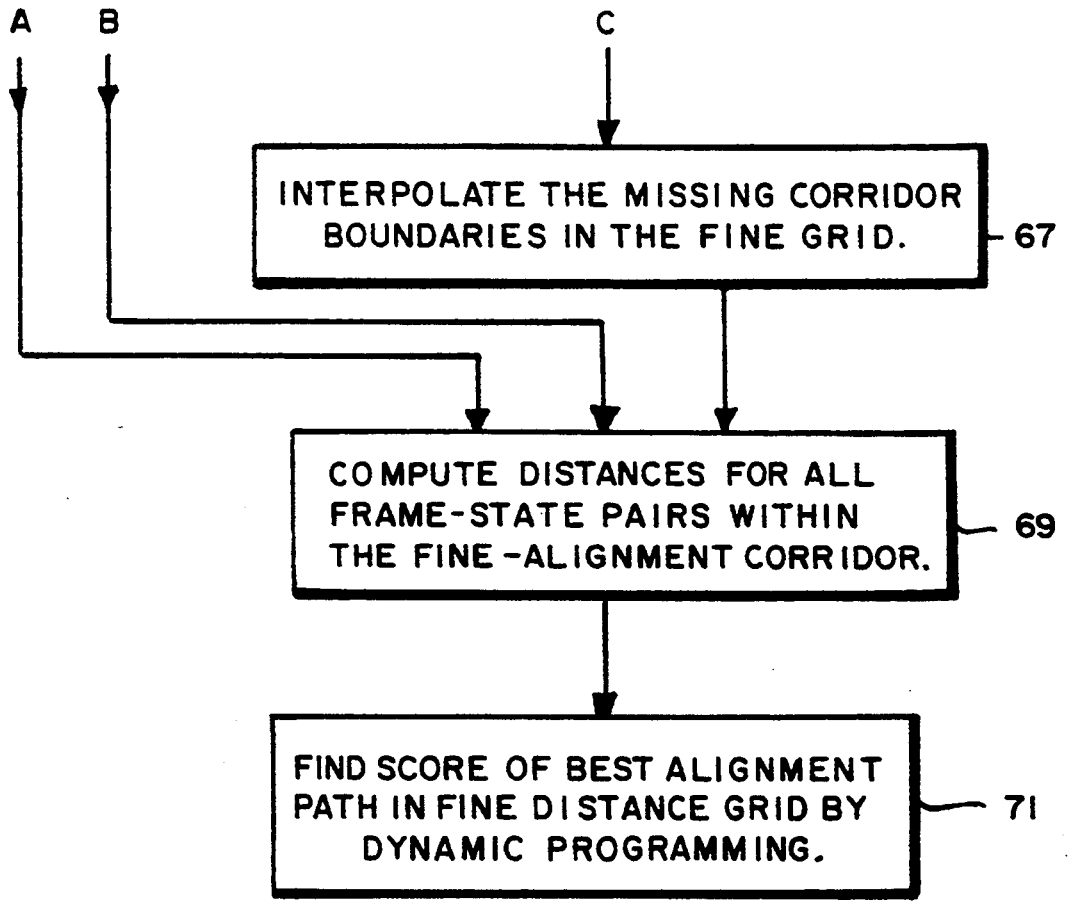

The procedure for defining the corridor is illustrated in the flowchart FIGS. 6A and 6B. This corridor defining procedure incorporates, in blocks 55 and 57, the subsampling procedure of FIG. 5 which subsamples, respectively, the unknown pattern, designated by reference character 51, and the reference pattern, designated by reference character 53.

Using the coarse sequences obtained from blocks 55 and 57, a coarse grid, i.e. corresponding to FIG. 2, is defined as indicated by the block at reference character 59. As indicated at block 61, the best alignment path through the coarse grid is determined by dynamic programming and trace back (Viterbi decoding). For each coarse path point in the coarse grid, boundaries for the alignment corridor are determined as indicated at block 63 and these boundaries are transferred or overlaid to the fine matrix or grid, as indicated at block 65. Using a predetermined metric, the corridor boundaries are interpolated in the fine grid as indicated at block 67. In FIG. 3 of the simplified embodiment described previously, this metric is established merely by going four frames above and below the best coarse path.

Distances are then calculated for all pairs within the corridor, as indicated at block 69, and the score of the best alignment path through the fine grid or matrix is determined by dynamic programming such as Viterbi decoding, this procedure being indicated at block 71.

A computer program providing a practical implementation of the procedures illustrated in the flowcharts of FIGS. 5 and 6A-B is shown in an Appendix accompanying this specification. This computer program is written in the C programming language.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

APPENDIX

Apr 16 15:35 1992   /usr/vlad/speech/rv6mips/vqwarp3/patmcwp.c Page 1

```
include <stdio.h> define HORIZONTAL      1
define VERTICAL        2
#define DIAGONAL        3
#define OFFSET          1
#define MAXFRAMES       600
#define WINDOW_SCALE    256
define BIG             0x7fffff static int              FRTestLen,
                        FRTstToken[MAXFRAMES],
                        TstFrMap[MAXFRAMES], FRRefLen,
                        FRRefModel[MAXFRAMES],
```

```
                    RefFrMap[MAXFRAMES],

FWBotLim[MAXFRAMES],
                    FWTopLim[MAXFRAMES],

Pred[MAXFRAMES][MAXFRAMES],
                    Cd[MAXFRAMES+OFFSET][MAXFRAMES+OFFSET], CWwindow, FWwindow, FRRate;

float   MCWarp( TstToken, TestLen, RefModel, RefLen, CW, FW, FR )

int             *TstToken, *RefModel;
        int             TestLen, RefLen;

/*===================================================================

FUNCTION:       MCWarp() aligns an input pattern with a reference
                model using an efficient two-stage algorithm and
                returns the best alignment distance.

'TstToken' is a pointer to the first frame of the
                input utterance, 'RefModel' points to the first
                frame of the reference model. 'TestLen' and 'RefLen'
                are the number of frames and states in the input and
                reference, resp. 'CW' is the coarse warp alignment
                window width, 'FW' is the finewarp alignment window
                width and 'FR' is the coarse warp subsampling rate.

===================================================================
!*/
{
float   FineWarp();
void    Compress(), CoarseWarp();

float   result;

CWwindow = CW;
FWwindow = FW;
FRRate   = FR;

if ( (TestLen > MAXFRAMES) || (RefLen > MAXFRAMES) )
    {
    fprintf( stderr, "input length exceeds maximum\n" );
    return( -1.0 );
    }

Compress( TstToken, TestLen, FRTstToken, &FRTestLen );
Compress( RefModel, RefLen,  FRRefModel, &FRRefLen  );

CoarseWarp( FRTstToken, FRTestLen, TestLen, FRRefModel, FRRefLen, RefLen );

result = FineWarp( TstToken, TestLen, RefModel, RefLen );

return( (float)(result) );
} void    Compress( intokptr, intoklen, outtokptr, outtoklen )

int             *intokptr, *outtokptr;
        int             intoklen, *outtoklen;

/*===================================================================

FUNCTION        :       Linearly subsamples an input pattern. Always copies
                        first and last frames. Stores Input-output frame
``` map.
'intokptr' is a pointer to the input, unreduced pattern and 'intoklen' is the length in frames. 'outtokptr' is a pointer to the subsampled pattern and 'outtoklen' is its length.

=====================================================================*/
```
{
int     i, outlen;
int     *inp, *outp;

inp = intokptr;
outp = outtokptr;

for ( i = 0, outlen = 0; i < intoklen-1; i += FRRate, inp += FRRate, outp++ )
    {
    *outp = *inp;
    TstFrMap[outlen] = i;
    outlen++;
    } inp  = intokptr + intoklen - 1;        /* Copy last frame. */
outp = outtokptr + outlen;
TstFrMap[outlen] = intoklen - 1;

outlen++;
*outp = *inp;
*outtoklen = outlen;
} void    CoarseWarp( tsttokptr, frtstlen, tstlen, refmodptr, frreflen,
                    reflen )

int             *refmodptr, *tsttokptr;
        int             reflen, tstlen, frreflen, frtstlen;
```

/*===================================================================

FUNCTION           :    Computes the boundaries of the search region for
                        a full-resolution fine warp. Accomplishes this
                        by aligning a subsampled test token with a subsampled
                        ref model and interpolating the finewarp search region
                        limits from offsets from the coarse warp path.

'tsttokptr' is a pointer to the first frame of the
                        subsampled test token, 'frtstlen' is the length in
                        frames of the subsampled test token, 'tstlen' is
                        the original length.

Uses a function Dist() which returns a measure
                        of the similarity between a test token frame
                        and a reference model state.

=====================================================================*/
```
{
int     Dist(), min(), max();

int     i, j, offset, minv, fd, minj, maxj, slope, b, ind1, ind2, topslope,
        botslope, newlim, center, FWTstInd, FWRefInd, fwt, fwb, fwwin;

int     *CdVp, *CdHp, *CdDp, *CdCp, *predp, *mframep, *tframep, *tfrp;

mframep = refmodptr;
tframep = tsttokptr;
fwwin   = FWwindow;
```

```
/* Compute warp slope and offset from uncompressed token lengths. */
if ( reflen > 1 )
        slope = ((tstlen-1) << 8) / ( reflen - 1);
else
        {
        fprintf( stderr, "Model length <= 1\n" );
        return;
        } if ( CWwindow >= ( ( slope + WINDOW_SCALE ) >> 9 ) )
        b = ( CWwindow << 8 );
else
        b = ( ( slope + WINDOW_SCALE ) >> 1 );

for ( i = 1; i < frreflen+OFFSET; i++ )
        {
        CdCp = &(Cd[i][0]);
        for ( j = 0; j <= frtstlen+OFFSET; j++ )
                *CdCp++ = BIG;
        }
Cd[0][0] = 0;

for ( i = 0, center = 0; i < frreflen; i++, center += slope )
        {
        minj    = ( ( center - b ) >> 8 );
        minj    = max( minj, 0);
        maxj    = ( ( center + b ) >> 8 );
        maxj    = min( frtstlen-1, maxj );
        CdHp    = &(Cd[i-1+OFFSET][minj+OFFSET]);
        CdDp    = CdHp - 1;
        CdCp    = &(Cd[i+OFFSET][minj+OFFSET]);
        CdVp    = CdCp - 1;

tfrp = tframep + minj;
        predp = &(Pred[i][minj]);
        for ( j = minj; j <= maxj; j++, tfrp++, predp++ )
                {
                fd = Dist( tfrp, mframep );
                if ( *CdVp < *CdHp )
                        {
                        minv = *CdVp;
                        *predp = VERTICAL;
                        }
                else
                        {
                        minv = *CdHp;
                        *predp = HORIZONTAL;
                        }
                if ( *CdDp <= minv )
                        {
                        *CdCp = *CdDp + fd;
                        *predp = DIAGONAL;
                        }
                else
                        *CdCp = minv + fd;

CdCp++;
                CdHp++;
                CdDp++;
                CdVp++;
                }
        }

/* TraceBack and compute search region limits. */
for ( i = 0, CdCp = FWTopLim; i < frreflen; i++ )           /* Initialize. */
    *CdCp++ = 0;

for ( i = frreflen-1, j = frtstlen; i >= 0 && j >= 0; )
```

```c
{
FWRefInd = RefFrMap[i];
FWTstInd = TstFrMap[j];

newlim = FWTstInd + fwwin;
newlim = min( newlim, frtstlen-1 );
CdCp   = &(FWTopLim[FWRefInd]);        /* Retain previous upper limit */
*CdCp  = max( newlim, *CdCp );         /* for vertical transitions. */ newlim = FWTstInd - fwwin;
FWBotLim[FWRefInd] = max( newlim, 0 );

switch( Pred[i][j] )
        {
        case ( HORIZONTAL ):
                i -= 1;
                break;
        case ( VERTICAL ):
                j -= 1;
                break;
        case ( DIAGONAL ):
                i -= 1;
                j -= 1;
                break;
        default:
                fprintf( stderr, "traceback: impossible path\n" );
                return;
                break;
        }
}

/* Now interpolate the missing limits. */ for ( i = 0; i < frreflen-1; i++ )
    {
    ind1 = RefFrMap[i];
    ind2 = RefFrMap[i+1];
    fwt  = FWTopLim[ind1];
    fwb  = FWBotLim[ind1];

/* Make sure path is contiguous. */
    if ( ( offset = ( ( FWBotLim[ind2] - fwt ) - ( ind2 - ind1 ) ) ) > 0 )
        FWBotLim[ind2] -= offset;

topslope = ( ( ( FWTopLim[ind2] - fwt ) << 8 ) / ( ind2 - ind1 ) );
    botslope = ( ( ( FWBotLim[ind2] - fwb ) << 8 ) / ( ind2 - ind1 ) );

minj = botslope;
    maxj = topslope;
    CdCp = &(FWTopLim[ind1+1]);
    CdVp = &(FWBotLim[ind1+1]);
    j    = ( ind2 - ind1 - 1 );
    while( j-- )
        {
        *CdCp++ = ( fwt + ( maxj >> 8 ) );
        *CdVp++ = ( fwb + ( minj >> 8 ) );
        minj += botslope;
        maxj += topslope;
        }
    }
} float   FineWarp( tsttokptr, testlen, modptr, modlen )

int     *modptr, *tsttokptr;
        int     testlen, modlen;

/*=========================================================================
```

FUNCTION : Performs a full-resolution alignment of a test
pattern with a reference model, using search
constraint computed in a coarse warp. Returns
the best alignment distance.
=====================================================================*/
```
{
int     Dist();

int     i, j, minv;
int     *CdVp, *CdHp, *CdDp, *CdCp, *fwbp, *fwtp;
int     *mframep, *tframep, *tfrp;

mframep = modptr;
tframep = tsttokptr;

for ( i = 1; i < modlen+OFFSET; i++ )
    {
    CdVp = &(Cd[i][0]);
    for ( j = 0; j <= testlen+OFFSET; j++ )
        *CdVp++ = BIG;
    }
Cd[0][0] = 0;

fwbp = FWBotLim;
fwtp = FWTopLim;

for ( i = 0; i < modlen; i++, fwbp++, fwtp++, mframep++ )
    {
    CdCp    = &(Cd[i+OFFSET][*fwbp+OFFSET]);
    CdVp    = CdCp - 1;
    CdHp    = &(Cd[i-1+OFFSET][*fwbp+OFFSET]);
    CdDp    = CdHp - 1;

tfrp = tframep + *fwbp;
    for ( j = *fwbp; j <= *fwtp; j++, tfrp++, CdHp++, CdDp++, CdVp++ )
        {
        if ( *CdVp < *CdHp )
            minv = *CdVp;
        else
            minv = *CdHp;

if ( *CdDp <= minv )
            minv = *CdDp;

*CdCp++ = minv + Dist( tfrp, mframep );
        }
    } return( (float) minv / ( modlen+testlen ) );
}
```

What is claimed is:

1. In a speech recognizer which operates to match an unknown speech segment comprising a fine sequence of frames with model segments represented by respective fine sequences of states, the respective fine sequences of the unknown segment an a model segment together defining a fine matrix; a method of determining a good alignment of the unknown segment with a model segment, said method comprising:

preparing respective coarse sequences representing said unknown speech segment and said model segment thereby to obtain a respective coarse matrix;

determining a best alignment of said coarse sequences thereby determining a coarse path through said coarse matrix;

overlaying said coarse path on said fine matrix and determining which fine matrix locations lie within a preselected metric of said coarse path thereby defining a corridor of possible paths through said fine matrix; and calculating only transitions within said corridor, determining an alignment of said unknown segment with said model segment.

2. The method according to claim 1 wherein said coarse sequences are obtained by subsampling the respective fine sequences, skipping a predetermined number between subsamples.

3. The method according to claim 2 wherein said coarse sequences include the first and last items from the respective fine sequences.

4. The method according to claim 1 wherein the best alignment of said coarse sequences is determined by Viterbi decoding.

5. The method according to claim 4 wherein the alignment of fine sequences is obtained by Viterbi decoding constrained to transitions within said corridor.

6. The method according to claim 1 wherein said predetermined metric selects as being within said corridor only fine matrix locations which are within a predetermined number of frames of said coarse path.

7. In a speech recognizer which operates to match an unknown speech segment comprising a fine sequence of multi-dimensional spectral frames with model segments also represented by a respective fine sequences of states, the respective fine sequences of the unknown segment and a model segment together defining a fine matrix which encompasses all possible alignments of the unknown segment fine sequence with the respective model segment fine sequence; a method of determining a good alignment of the unknown segment fine sequence with a model segment fine sequence, said method comprising:

preparing respective coarse sequences representing said unknown speech segment and said model segment thereby to obtain a coarse matrix representing possible alignments of said unknown and model segments;

determining a best alignment of said coarse sequences thereby determining a coarse path through said coarse matrix;

overlaying said coarse path on said fine matrix and interpolating between the locations defining said coarse path thereby to determine a base path across said fine matrix;

determining which fine matrix locations lie within a preselected metric of said coarse path thereby defining a corridor comprising a limited number of possible paths through said fine matrix; and calculating only transitions within said corridor, determining a best alignment of said unknown segment fine sequence with said model segment fine sequence.

8. The method as set forth in claim 7 wherein said coarse sequences are obtained by subsampling the respective fine sequences.

9. The method as set forth in claim 8 wherein said predetermined metric selects as being within said corridor only fine matrix locations which are within a preselected number of frames of said base path.

10. In a speech recognizer which operates to match an unknown speech segment comprising a fine sequence of frames with model segments represented by respective fine sequences of states, the respective fine sequences of the unknown segment and a model segment together defining a fine matrix which encompasses all possible alignments of the unknown segment with the respective model segment; a method of determining a good alignment of the unknown segment with a model segment, said method comprising:

subsampling the respective fine sequences thereby to obtain respective coarse sequences representing said unknown speech segment and said model segment and thereby to define a coarse matrix representing possible alignments of said unknown and model segments;

determining a best alignment of said coarse sequences thereby determining a coarse path through said coarse matrix;

overlaying said coarse path on said fine matrix and interpolating between the locations defining said coarse path thereby to determine a base path across said fine matrix;

determining which fine matrix locations lie within a preselected number of locations of said base path thereby defining a corridor of possible paths through said fine matrix; and calculating only transitions within said corridor, determining a best fine alignment of said unknown segment with said model segment.

* * * * *

UNITED STATES PATENT AND TRADEMARK OFFICE
CERTIFICATE OF CORRECTION

PATENT NO. : 5,337,394
DATED : August 9, 1994
INVENTOR(S) : Vladimir Sejnoha

It is certified that error appears in the above-indentified patent and that said Letters Patent is hereby corrected as shown below:

On the title page, item [57], Abstract, line 2,
"sediment" should be --segment--; and at end of line 3,
"sediment" should be --segment--.

Column 1, line 22, "segment" should be --sequence--.

Signed and Sealed this

Eleventh Day of February, 1997

BRUCE LEHMAN

Attest:

Attesting Officer    Commissioner of Patents and Trademarks